United States Patent Office 3,337,323
Patented Aug. 22, 1967

3,337,323
PROCESS OF MANUFACTURING FLAT GLASS ON A MOLTEN METAL BATH
David Gordon Loukes, Prescot, and John Graham Banner, Meols, Hoylake, England, assignors to Pilkington Brothers Limited, Liverpool, England, a corporation of Great Britain
No Drawing. Filed Aug. 1, 1963, Ser. No. 300,126
The portion of the term of the patent subsequent to Feb. 21, 1984, has been disclaimed
1 Claim. (Cl. 65—65)

ABSTRACT OF THE DISCLOSURE

A method of reducing the migration of molten bath metal to a glass ribbon in the manufacture of flat glass during which the glass is supported in the form of a ribbon on the bath of molten metal, this migration being caused by the presence of oxygen and sulphur impurities in the bath metal, the method comprising adding to the bath metal an element with which oxygen and sulphur react in preference to reaction with the bath metal and which forms therewith a compound which is soluble in the undersurface of the glass. The glass ribbon advances along the bath and out of the bath and thereby carries out of the bath the reaction products dissolved in its undersurface.

---

This invention relates to the manufacture of flat glass, and in particular to the manufacture of flat glass in ribbon form.

It is a main object of the present invention to provide an improvement in the manufacture of flat glass during which glass is in contact with molten metal.

In the manufacture of flat glass during which glass is in contact with molten metal, according to the invention, there is maintained in the molten metal at least a trace of an element with which an impurity in the molten metal preferentially reacts to form a product at least a part of which is dissolved in the underface of the glass.

Further in the manufacture of flat glass in ribbon form during which the glass is supported on a bath of molten metal, according to the invention, there is maintained in the bath at least a trace of an element with which an impurity in the bath preferentially reacts to form a product at least a part of which is dissolved in the underface of the glass.

The bath metal is for example a bath of molten tin or a tin alloy having a specific gravity greater than glass and in which tin predominates, and the bath is so constituted as to have all the characteristics fully described in U.S. Patent No. 2,911,759. The trace element may be distributed through the whole of the bath but from another aspect of the invention there is maintained in at least one region of the bath at least a trace of an element with which an impurity in the bath preferentially reacts to form a product at least a part of which is dissolved in the underface of the glass.

Further the invention comprises in the manufacture of flat glass in ribbon form during which the glass is supported on a bath of molten metal over which a plenum of protective atmosphere is maintained, additionally protecting the bath by incorporating in the bath an element with which an impurity in the bath preferentially reacts to form a product at least a part of which is dissolved in the underface of the ribbon of glass.

The product or products which is or are dissolved in the underface of the ribbon, are present in such small quantities that they do not adversely affect the quality of the glass leaving the bath, which glass may have flat, parallel faces whose surfaces have a lustre of "fire finish" quality.

Conveniently said element is continually incorporated in the bath at a rate such that there is maintained in the bath a trace of the said element.

Accordingly, the present invention also comprises in the manufacture of flat glass in ribbon form during which the glass is supported on a bath of molten metal, continually incorporating in the bath an element with which an impurity in the bath preferentially reacts to form a product at least a part of which is dissolved in the underface of the glass.

From a further aspect, the present invention comprises in the manufacture of flat glass in ribbon form having a polished surface during which the glass is supported on a bath of molten tin, cleansing the molten tin by maintaining in the bath at least a trace of a metal with which an impurity in the bath preferentially reacts to form a product at least a part of which is dissolved in the underface of the glass while preserving the surface finish of the underface of the ribbon of glass.

Bath metal is thought to migrate into the glass owing to the presence in the bath of dissolved oxygen and/or sulphur, for example, which may gain access to the headspace over the bath or which may enter the bath from the ribbon of glass.

The element which is incorporated in the bath of molten tin may be added directly to the molten tin supporting the glass, and the element is one with which an impurity in the bath, for example oxygen and/or sulphur, reacts preferentially rather than with the tin of the bath.

According to a still further aspect, the present invention comprehends in the manufacture of flat glass in ribbon form during which the glass is supported on a bath of molten tin, inhibiting the formation in the bath of tin compounds by continuously incorporating in the bath at least one element selected from the group consisting of lithium, sodium, potassium, magnesium, calcium, barium, indium, iron and zinc, whereby a reaction product of the said element with an impurity in the bath is at least partly dissolved in the underface of the glass ribbon.

Magnesium, zinc, lithium and calcium have been found to be particularly suitable elements for incorporation individually in the bath of molten tin, each forming with the impurities at least one product which migrates from the bath into the surface of the glass ribbon.

The control of migration is such that the amount of tin which may become incorporated in the underface of the ribbon is so small as not to produce any harmful effects.

From yet another aspect the invention also comprehends in the manufacture of flat glass in ribbon form during which the glass is supported on a bath of molten metal, maintaining in the bath at least a trace of an element with which impurities in the bath preferentially react, whereby migration of said element from the bath into the underface of the glass ribbon as the ribbon is advanced is controlled while preserving the characteristics of the underface of the ribbon of glass.

In the manufacture of flat glass in ribbon form according to the invention during which the glass is supported on a bath of molten tin, apparatus as described for example in U.S. Patent No. 2,911,759 may be employed, in which a bath of molten tin or tin alloy having a specific gravity greater than glass, is contained in a tank structure over which a plenum of a protective atmosphere is maintained.

Magnesium is preferably added to the bath in the form of a magnesium/tin alloy, e.g. 5% magnesium, 95% tin in order to maintain in the bath an overall concentration of magnesium of the order of 10 parts per million.

Calcium, lithium, sodium and potassium may also be added to the bath in the form of an alloy with tin.

Other additive elements may be added to the bath in pure metallic form. For example, according to the invention, pure metallic zinc may be added to the molten tin in a proportion by weight sufficient to maintain an overall concentration of zinc in the bath of the order of 250 parts per million. Iron and indium may also be added in pure metallic form.

In an alternative method according to the invention molten tin may be continuously extracted from the bath for recirculation back into the bath, and during this recirculation the alloy or pure metal is added to the tin.

The concentration of additive element in the tin bath is in excess of that required for reaction with the impurities for example oxygen and sulphur, in the bath, the level of these impurities dissolved in the bath depending on the amount of oxygen and sulphur gases which find their way into the plenum of protective atmosphere over the bath, and the amounts of oxygen and sulphur which enter the bath from the glass.

That is the maintenance of this concentration of scavenging element in the bath ensures that substantially all of the oxygen and sulphur in the bath reacts preferentially with the element rather than with tin, so that the oygen and sulphur become associated with additive element in the bath to form an oxide or sulphide.

Provided care is taken to avoid excessive contamination of the bath tin by the atmosphere and the glass, any compound which is formed in the bath as a result of reaction between scavenging element and impurities and which is absorbed or dissolved in the underface of the ribbon of glass, is not in sufficient quantity to produce any harmful effect on the quality and finish of the glass, and is continuously removed from the bath in the ribbon of glass. At least a proportion of the reaction products may be removed by volatilisation into the atmosphere over the bath, or by physically removing a dross from the bath surface.

The surface finish of the ribbon of glass produced on a molten metal bath incorporating an additive element, as described above, is preserved so that the ribbon of glass leaving the bath has a surface brightness at least equal to that obtained by "fire finish" treatment and the presence in the undersurface of the ribbon of a product or products of the scavenging of the metal of the bath in no way impairs the surface quality of the glass.

The scavenging of the molten metal bath according to the invention ensures that the migration of the bath metal into the underface of the ribbon of glass is controlled at a low level.

The invention also comprehends flat glass produced by a method according to the invention on a bath of molten metal, e.g. molten tin, characterised in that the underface of the ribbon has dissolved therein at least one harmless product of the reaction of bath impurities with an additive element as described above, so that the surface concentration in the underface of the glass ribbon of bath metal does not exceed a predetermined maximum value.

This gives the advantage that impurities, e.g. oxygen or sulphur, which may be in the bath, are converted into a harmless product which may be incorporated in the underface of the ribbon of glass. Furthermore, the method according to the invention safeguards against the possibility of other side effects arising, for example, when the glass is subjected to heat treatment in the presence of oxygen.

The invention also comprehends a sheet of glass cut from flat glass manufactured by the method described above and having the above-mentioned characteristics.

We claim:

In the manufacture of flat glass in ribbon form during which the glass is supported on a bath of molten metal, and the glass in ribbon form is advanced along said bath and out of said bath and said bath contains as impurities oxygen and sulphur, which cause migration of the bath metal into the glass, the method comprising maintaining in the bath a selected element with which oxygen and sulphur impurities in the bath preferentially react to form a compound which is soluble in the undersurface of the ribbon of glass, whereby migration of said bath metal into the undersurface of the glass ribbon is substantially reduced, and whereby said compound dissolved in the undersurface of the glass ribbon is carried out of the bath by the glass ribbon.

References Cited

UNITED STATES PATENTS

| | | | |
|---|---|---|---|
| 2,754,559 | 7/1956 | Fromson | 22—200.1 |
| 2,911,759 | 11/1959 | Pilkington et al. | 65—65 |
| 3,218,141 | 11/1965 | Lambert | 65—65 |
| 3,218,143 | 11/1965 | De Jaret | 65—65 |

DONALL H. SYLVESTER, *Primary Examiner.*

A. D. KELLOGG, *Assistant Examiner.*